United States Patent [19]
Onofrio

[11] Patent Number: 5,702,218
[45] Date of Patent: Dec. 30, 1997

[54] FASTENER

[76] Inventor: Daniel Onofrio, 109 Scantic Rd., East Windsor, Conn. 06088

[21] Appl. No.: 571,764

[22] Filed: Dec. 13, 1995

[51] Int. Cl.$^6$ .................................................. F16B 21/00
[52] U.S. Cl. .............................. 411/552; 411/341; 411/343
[58] Field of Search .................................. 411/552, 340, 411/341, 343, 344, 345, 387

[56] References Cited

U.S. PATENT DOCUMENTS

| | | | |
|---|---|---|---|
| 196,914 | 11/1877 | Lockwood | 411/343 |
| 1,061,480 | 5/1913 | Kennedy . | |
| 1,159,420 | 11/1915 | Rubly . | |
| 1,349,344 | 8/1920 | O'Neill | 411/342 |
| 2,246,834 | 6/1941 | Bowman | 411/342 |
| 2,298,203 | 10/1942 | Eklund | 85/37 |
| 2,324,687 | 7/1943 | Finkle | 411/341 |
| 2,540,145 | 2/1951 | Stevens | 85/3 |
| 2,567,372 | 9/1951 | Gelpcke | 411/342 |
| 2,587,058 | 2/1952 | Melrose | 411/344 |
| 2,771,259 | 11/1956 | Laystrom | 248/28 |
| 3,604,304 | 9/1971 | Botting | 411/343 |
| 3,738,217 | 6/1973 | Walker | 85/8.6 |
| 4,075,924 | 2/1978 | McSherry et al. | 85/3 |
| 4,138,921 | 2/1979 | McGauran et al. | 85/7 |
| 4,233,878 | 11/1980 | McGauran et al. | 85/7 |
| 4,245,545 | 1/1981 | Freeman | 411/342 |
| 4,286,497 | 9/1981 | Shamah | 411/342 |
| 4,406,108 | 9/1983 | Beck et al. | 52/741 |
| 4,573,844 | 3/1986 | Smith | 411/340 |
| 4,630,956 | 12/1986 | Gilbreath | 411/344 |
| 4,657,461 | 4/1987 | Smith | 411/340 |
| 4,810,146 | 3/1989 | Sinclair | 411/342 |
| 4,813,834 | 3/1989 | Smith | 411/337 |
| 4,834,601 | 5/1989 | Schaap | 411/340 |
| 5,209,621 | 5/1993 | Burbidge | 411/340 |
| 5,439,338 | 8/1995 | Rosenberg | 411/387 |
| 5,509,765 | 4/1996 | Albin | 411/344 |

FOREIGN PATENT DOCUMENTS

| | | | |
|---|---|---|---|
| 508455 | 12/1954 | Canada | 411/342 |
| 10927 | 9/1980 | Germany | 411/340 |
| 277949 | 4/1990 | Germany | 411/343 |
| 780499 | 8/1957 | United Kingdom | 411/341 |

*Primary Examiner*—Steven N. Meyers
*Assistant Examiner*—Gary Estremsky
*Attorney, Agent, or Firm*—St. Onge Steward Johnston & Reens

[57] ABSTRACT

A toggle fastener which eliminates the need for time-consuming manipulation of a fastener nut comprises a bolt with a head and a stop collar adjacent the bolt head, a wing toggle threaded onto the free end of the bolt, and a spring which extends from the stop collar to a washer. The washer may be flat or a self-centering conically shaped washer. The invention permits the toggle and toggle fastener to be inserted into an aperture in a panel and to then be automatically secured to the wall with an effective firestop provided by the effect of the spring urging the washer into firm contact with the panel.

27 Claims, 3 Drawing Sheets

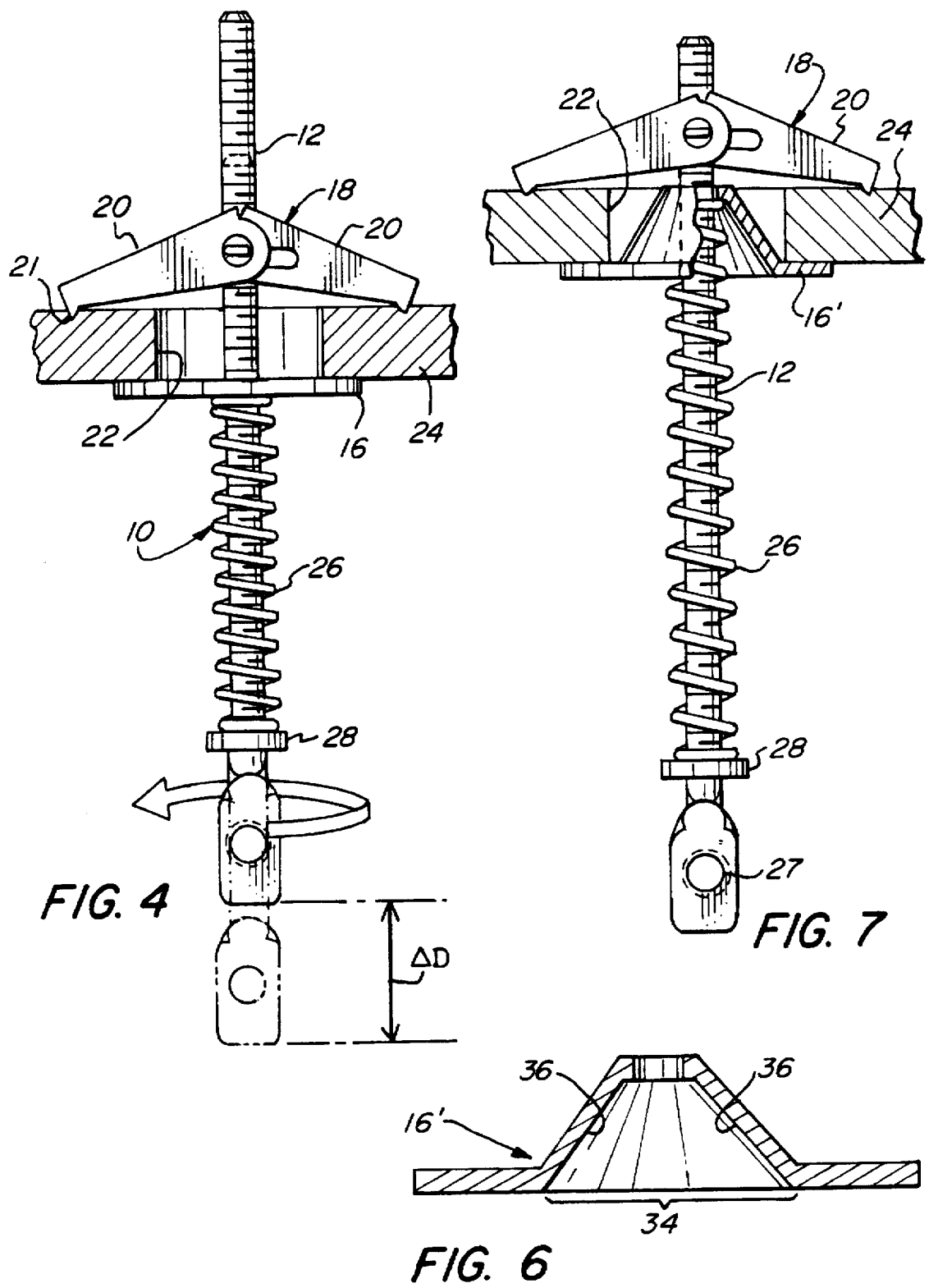

FASTENER

FIELD OF THE INVENTION

This invention relates to industrial hangers and, in particular, to toggle fasteners used to hang drop ceilings.

BACKGROUND OF THE INVENTION

A toggle fastener 100, of the type currently known in the art, is shown in FIG. 1. This toggle fastener 100 typically consists of a bolt 102 onto which is mounted a nut 104 and a washer 106, and a spring-loaded wing toggle 108. With this conventional toggle fastener the toggle wings 110 are compressed against the bolt and the fastener 100 is inserted into a blind hole through a wall, or more commonly, a ceiling such as a plaster ceiling or a drywall panel, or other types of material in need of repair, and, when the toggle exits the other side of the panel, the wings 110 expand preventing the toggle fastener from being pulled back through the hole. It is to be appreciated that it is necessary to back the nut 104 away from the toggle 108 to provide clearance for the wings 110 to be folded back in order to insert the toggle through the hole. This can add significantly to the time needed to install the toggle. This problem arises due to the inconsistency of the location of the nut 104 on the shaft of the bolt 102.

The nut 104 and washer 106 are then advanced until tight against the panel such that the panel is compressed between the washer 106 and the toggle 108. The toggle fastener 100 is then rigidly secured to the panel and may support a load, such as a section of a drop ceiling, from the exposed end 112 of the bolt.

While the prior art toggle fastener 100 is effective to hang loads from drywall ceilings, it is time consuming to install. In particular, the steps of backing the nut 104 away from the toggle 108 and then advancing the nut 104 to secure the fastener 100 require significant amounts of time, especially when it is considered that hundreds of such fasteners will be required for a commercial construction project.

A potentially dangerous problem also arises with such prior art fasteners 100. In particular, installers frequently do not completely tighten the nut 104 and washer 106 against the drywall ceiling panel, thereby leaving an open passageway between the two sides of the panel which is a fire code violation since there is no fire stop in the ceiling.

An example of a device which avoids some of the problems of previous designs is U.S. Pat. 4,286,497 to Shamar which discloses a toggle fastener with a plastic ratchet assembly for quickly tightening the toggle and washer against a panel. In the Shamar device, the ratchet assembly consists of two plastic strips attached to the spring-loaded toggle. The strips pass through slots in a plastic washer and include ratchet ridges. The slots in the plastic washer are designed to allow the washer to slide over the strips in the direction of the toggle. To install the Shamar device, the toggle is compressed and inserted into a blind hole. The strips are inserted into the washer and the ends are pulled apart thereby sliding the washer toward the panel and toggle, and securing the fastener to the panel. A means to hang a drop ceiling, such as a bolt, may then be threaded through the center of the plastic washer.

While the Shamar device does decrease the time and effort necessary to tighten a fastener, the design does not meet building and fire codes which prohibit the use of plastic fasteners. Moreover, the amount by which the Shamar device may be tightened is limited by the amount of tension that the installer can generate in the strips and by the amount of tension that the strips may withstand. Also, the Shamar device as well as the prior art device of FIG. 1 do not provide for any resiliency once tightened. Any substantial movement of the above described fasteners would cause permanent loss of rigidity and would likely damage either the fastener, the panel, or both, and/or create a passage for fire.

Another example of a prior device is U.S. Pat. No. 4,600,344 to Sutenbach which discloses a push-on plastic wing-nut fastener. This device also decreases the assembly and installation time as compared to conventional toggle fasteners, however as above, building and fire codes would likely not permit it use in general construction and its rigidity and resiliency is limited.

What is desired therefor is a means to secure a toggle fastener to a panel which requires a minimum amount of assembly and installation time, which provides a nearly fool-proof fire stop to insure compliance with applicable building and fire codes, and which is rigid once installed yet allows from some resilient deflection.

SUMMARY OF THE INVENTION

It is an object of the invention to provide a means to mount a toggle fastener to a drywall panel with a minimum amount of time and effort.

Another object of the invention is to provide a toggle fastener having a means to automatically locate a washer against the panel.

Yet still another object of the invention is to provide a toggle fastener of the above character which automatically closes the passageway through the panel, and maintains a positive closure even if the toggle fastener is disturbed.

Still another object of the invention is to provide a toggle fastener of the above character having a means to adjust to panels of different widths.

Yet another object of the invention is to provide a toggle fastener of the above character having a means to manually increase the tightness of the fastener.

The above and other objects are achieved with the toggle fastener of the present invention which comprises a threaded bolt having a stop collar, a spring disposed over the bolt which has a first end in contact with the stop collar, a washer disposed over the bolt which is in contact with a second end of the spring, and a spring-loaded toggle threaded onto the bolt such that the washer lies between the second end of the spring and the toggle. Upon insertion of the toggle fastener through a panel, the spring automatically advances the washer to fit snugly against the panel and secures the fastener in place on the panel. Once installed, the threaded bolt may be rotated to decrease the distance between the stop collar and the toggle thereby compressing the spring further and increasing the tightness of the fastener, if desired, and/or for the purpose of adjusting the position of the lower end of the bolt.

Other objects, aspects and features of the present invention in addition to those mentioned above will be pointed out in or will be understood from the following detailed description provided in conjunction with the accompanying drawings.

BRIEF DESCRIPTION OF THE DRAWINGS

FIG. 4 is a side view of the fastener of FIG. 2 showing the step of manually rotating the threaded bolt to increase the tightness of the fastener once installed and/or to adjust the position of the bolt lower end.

FIG. 6 is a side view of the self-aligning washer of the present invention.

FIG. 7 is a side view of the fastener of FIG. 2 using the self-aligning washer of FIG. 6.

DETAILED DESCRIPTION OF THE INVENTION

Figure 1:
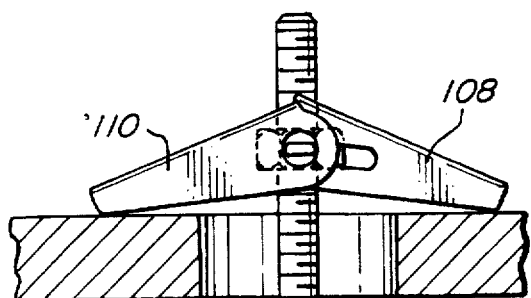
FIG. 1 is a side view of a prior art toggle fastener.

Referring to FIGS. 2–9, where like elements are identified by the same reference numerals, a toggle fastener 10 includes a threaded bolt 12, a washer 16, a spring-loaded toggle 18, a spring 26 and a stop collar 28. The stop collar 28 limits the movement of one end 30 of the spring 26 while the other end 32 of spring 26 extends the length of the bolt 12 and maintains pressure against the washer 16 and panel 24 when the fastener 10 is installed.

To install the toggle fastener 10 of the present invention, an aperture or passageway 22 is cut in panel 24. The toggle 18 is then inserted through the aperture 22, causing the wings 20 of the toggle 18 to be folded inward toward the bolt 12 to permit the toggle 18 to pass through passageway 22. As toggle 18 passes through aperture 22 the washer 16 contacts the panel 24; further advancing of the toggle 18 causes the spring 26 to compress, allowing the washer 16 to move away from the toggle 18. When the toggle 18 passes entirely through the passageway 22, the wings 20 expand to anchor the toggle at the blind side of the panel 24. The spring 26 expands to snugly press the washer 16 against the panel 24 and secure the toggle fastener 10.

A significant portion of the time required for installation of prior devices—the initial retraction of the nut to provide clearance for the wings, as well as the advancing of the nut to press the washer 16 against the panel 24—is avoided. Moreover, the passageway 22 is automatically closed to provide a positive fire stop.

To assemble the present invention, only the toggle 18 need be threaded over the bolt 12. The other elements—the stop collar 28, spring 26 and washer 16—are not threaded and can be quickly disposed over the bolt 12. A significant portion of the time required for assembly of prior devices—the threading of the nut—is also avoided.

Referring to FIG. 4, after installation, the toggle fastener 10 of the present invention can be manually tightened by rotating the threaded bolt 12. This tightens the device because the wings 20 of the toggle 18 frictionally engage the panel 24 and prevent the toggle 18 from rotating along with the bolt 12. In an alternative embodiment, wings 20 may be provided with sharpened points 21 to enhance the anchoring of the wings 20 in the panel 24. Since the toggle 18 is threaded to the bolt 12, clockwise rotation of bolt 12 will cause the distance between the toggle 18 and the stop collar 28 to decrease the distance by AD thereby increasing the compression of the spring 26 and the force which is applied to the panel 24. The tightening also permits adjustment of the height of the end 27 of bolt 12 for leveling of a panel grid or framework to be hung from the end 27.

Importantly, while the toggle fastener 10 is securely attached to the panel 24, since the spring 26 is not fully compressed, the toggle fastener 10 retains some resiliency. That is, it may be displaced (inwardly or sideways) somewhat without damage to the fastener or the panel, and, once the displacing force is gone, it will resume its original position.

Figure 2:
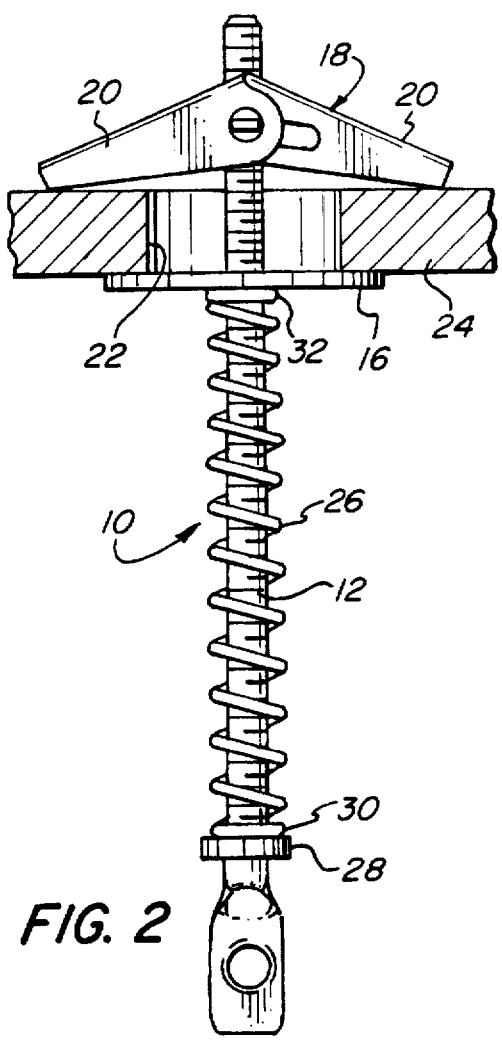
FIG. 2 is a side view of the toggle fastener of the present invention showing the fastener mounted to a panel.
Figure 5:
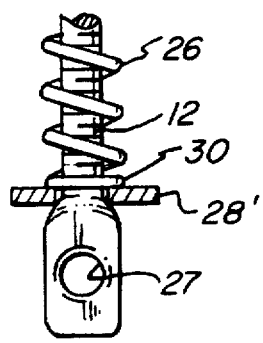
FIG. 5 is a side, close-up view of an embodiment of the fastener of FIG. 2 showing a stop collar consisting of a standard washer.
Figure 3:
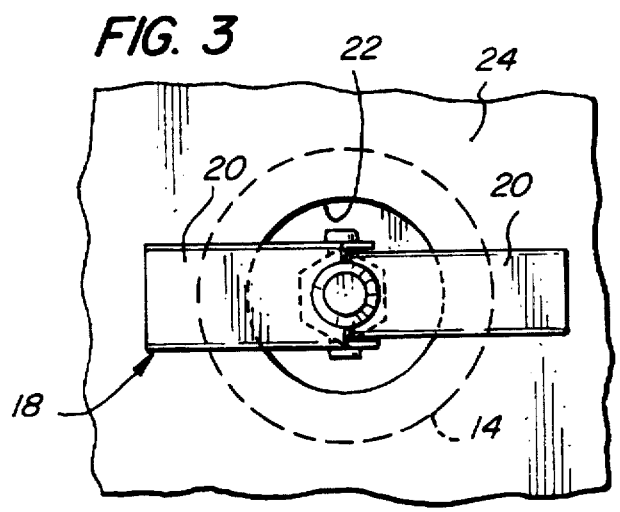
FIG. 3 is a top view of the fastener of FIG. 2.

Referring to FIG. 2, the stop collar 28 preferably is a circular flange formed integrally and in one piece with the bolt 12; alternatively, as shown in FIG. 5, the stop collar may comprise a stop washer 28' placed over the bolt 12; in other embodiments the stop collar may comprise two or more tabs extending radially from bolt 12, and as described above, may be formed integrally with or separate from the bolt 12. Alternatively, another portion of the bolt may act as a stop for the spring.

Washer 16 may be a flat annular washer, as shown in FIG. 2. However, in a preferred embodiment, shown in FIGS. 6 and 7, the washer may consist of a self-centering washer 16' having a conically-shaped center portion 34. As used herein, the term "conically shaped" includes frustoconical shapes and other tapered cross-sectional shapes having the ability to center the washer 16' on passageway 22. The walls 36 of the conical center portion 34 serve to urge the toggle fastener 10 toward the center axis of the passageway 22 when washer 16' is inserted in passageway 22. Washers 16, and 16', have center apertures which are greater in diameter than the diameter of bolt 12 so that the washer can move freely along the length of bolt 12.

Figure 8:
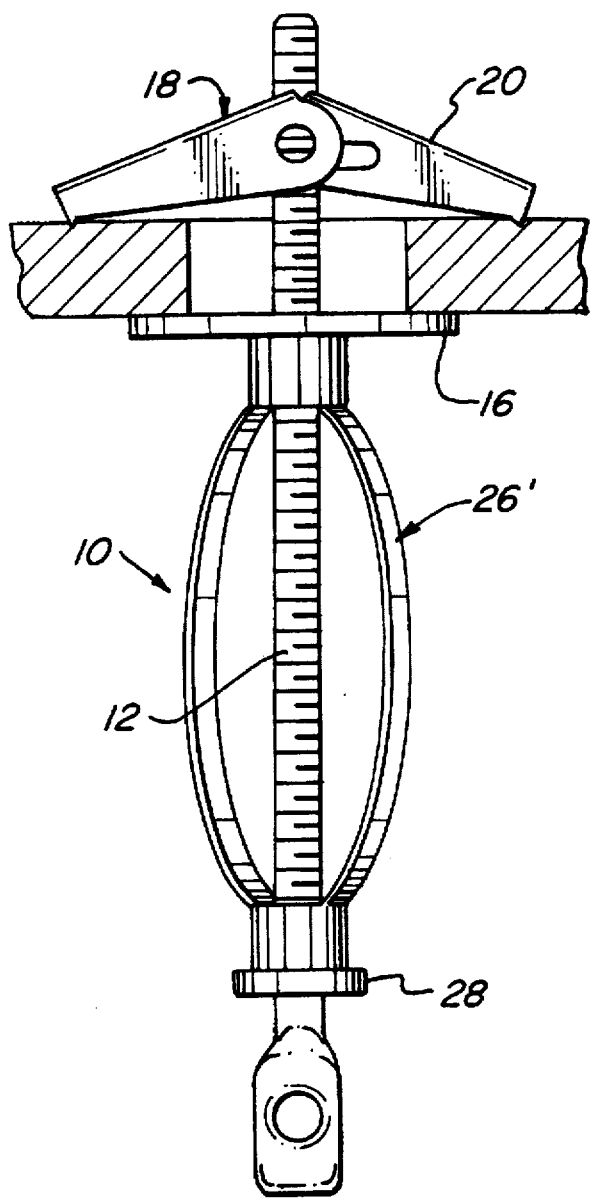
FIG. 8 is a side view of an alternative embodiment of the fastener of the invention.

The spring 26 is preferably a coil spring fitted onto bolt 12; however, as shown in FIG. 8, the spring 26' may be a flat spring or springs with apertures at each end thereof through which extends bolt 12. As seen in FIG. 2, the first end portion 30 of spring 26 is located adjacent stop collar 28. The second end portion 32 is adjacent washer 16. The springs 26,26' serve the function of biasing the washer 16,16' towards the wing toggle 18 to provide the automatic closure of passageway 22 and secure mounting of the fastener as described herein.

Figure 9:
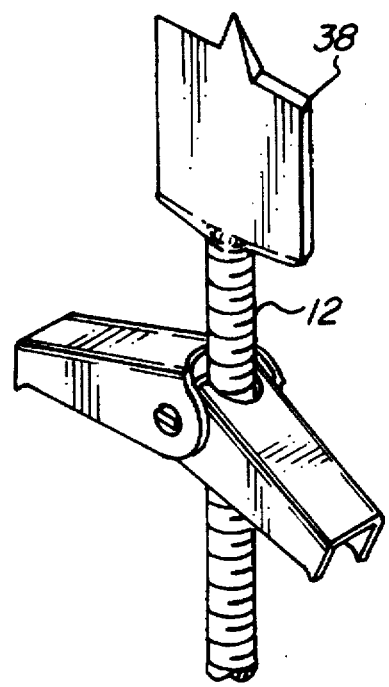
FIG. 9 is a side view of a self-drilling point in a fastener of FIG. 2.

If desired, a self drilling point 38 may be provided at the upper end of bolt 12, as shown in FIG. 9. The self drilling point may be a hole drill as illustrated, or a hole saw tip. This self drilling point is useful to permit the fastener 10 to be installed using a power screwdriver or other power tools, without need for making a passageway 22 by prior drilling or punching of the passageway.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A fastener comprising:
   a threaded bolt having first and second end portions;
   a spring disposed over said bolt, said spring having first and second end portions;
   means for suspending a framework for an acoustical ceiling including an aperture located at said first end portion of said bolt;
   a stop collar located adjacent said first end portion of said bolt, above said means for suspending, for limiting the movement of said first end portion of said spring toward said first end portion of said bolt;
   a firestop element disposed over said bolt, said firestop element being in contact with said second end portion of said spring;

a spring-loaded wing toggle biased to be normally open whereby wings of said wing toggle are non-parallel to said bolt threaded onto said second end portion of said bolt such that said firestop element lies between said toggle and said second end portion of said spring; said bolt being axially movable to clamp a panel between said wing toggle and said firestop element to permit tightening of said toggle fastener by rotation of said bolt relative to said wing toggle and to adjust a position of said aperture of said means for suspending a framework for an acoustical ceiling by rotating said bolt relative to said wing toggle, causing the interengaged threaded bolt and threaded wing toggle to raise or lower said position of said aperture.

2. A fastener as in claim 1, wherein said stop collar is integrally formed in one piece with said shaft.

3. A fastener as in claim 1, wherein said stop collar comprises a washer disposed over said bolt and further comprising, at said second end portion of said bolt, a means to limit the movement of said second washer.

4. A fastener as in claim 1 wherein said firestop element comprises a flat washer.

5. A fastener as in claim 1, wherein said firestop element comprises a washer that is self-centering in a passageway in a panel against which said firestop element is located.

6. A fastener as in claim 5, wherein said self-centering washer comprises a flat peripheral portion and a generally conically-shaped center portion extending towards said second end of said bolt which is adapted to be received in said passageway in said panel and to thereby center said washer in said passageway.

7. A fastener as in claim 1, wherein said spring comprises a coil spring and said bolt extends through a center portion of said coil spring.

8. A fastener as in claim 1, wherein said spring comprises at least one flat spring element having apertures at each end thereof and said bolt extends through said spring apertures.

9. A fastener as in claim 1, wherein said bolt has at its second end portion a self-drilling tip portion.

10. A toggle fastener, comprising:
a shaft having first and second end portions, and being threaded at its second end portion;
a spring loaded wing toggle, biased to be normally open whereby wings of said wing toggle are non-parallel to said shaft, having a threaded nut threaded onto said threaded second end portion of said shaft;
means for suspending a framework for an acoustical ceiling including an aperture located at said first end portion of said bolt;
a stop collar located near to said first end portion of said shaft above said means for suspending;
a firestop element fitted onto said shaft between said wing toggle and said stop collar;
a spring element extending between said stop collar and said firestop element to bias said firestop element towards said wing toggle;
whereby when said second end portion of said shaft is inserted from a first side of a panel through a passageway in said panel, said wing toggle is compressed, to pass through said panel, and said wing toggle reopens on a blind side of said panel, to prevent said toggle fastener from being removed from said panel, while said firestop element remains on said first side of said panel, said firestop element being pressed against said panel by said spring element to provide a positive closure of said panel passageway and to clamp said panel between said wing toggle and said firestop element to permit tightening of said toggle fastener by rotation of said shaft relative to said wing toggle.

11. A toggle fastener as in claim 10 wherein said stop collar is integrally formed in one piece with said shaft.

12. A toggle fastener as in claim 10 wherein said stop collar comprises a washer disposed over said shaft and further comprising, at said second end portion of said shaft, a means to limit the movement of said washer.

13. A toggle fastener as in claim 10 wherein said firestop element comprises a washer that is self-centering in a passageway in a panel against which said firestop element is located.

14. A toggle fastener as in claim 13 wherein said self-centering washer comprises a flat peripheral portion and a generally conically-shaped center portion extending towards said second end of said shaft which is adapted to be received in said passageway in said panel and to thereby center said washer in said passageway.

15. A toggle fastener as in claim 10, wherein said spring comprises a coil spring and said shaft extends through a center portion of said coil spring.

16. A toggle fastener as in claim 10, wherein said spring comprises at least one flat spring element having apertures at each end thereof and said shaft extends through said spring apertures.

17. A toggle fastener as in claim 10 wherein said firestop element comprises a flat washer.

18. A toggle fastener as in claim 10, wherein said shaft has at its second end portion a self-drilling tip portion.

19. The combination of a toggle fastener and a ceiling panel, comprising:
a ceiling panel having a first side and a passageway extending through said panel from said first side to a blind side of said panel; and
a toggle fastener including
a shaft having first and second end portions, and being threaded at its second end portion;
a spring loaded wing toggle biased to be normally open whereby wings of said wing toggle are non-parallel to said shaft, having a threaded nut threaded onto said threaded second end portion of said shaft;
means for suspending a framework for an acoustical ceiling including an aperture located at said first end portion of said bolt;
a stop collar located near to said first end portion of said shaft above said means for suspending;
a firestop element fitted onto said shaft between said wing toggle and said stop collar;
a spring element extending between said stop collar and said firestop element to bias said firestop element towards said wing toggle;
said second end portion of said shaft being inserted from said first side of said panel through said passageway in said panel, said wing toggle preventing said toggle fastener from being removed from said panel, said firestop element being located on said first side of said panel and being pressed against said panel by said spring element to provide a positive firestopping closure of said panel passageway and to clamp said panel between said wing toggle and said firestop element to permit tightening of said toggle fastener by rotation of said shaft relative to said wing toggle.

20. The combination as in claim 19 wherein said stop collar is integrally formed in one piece with said shaft.

21. The combination as in claim 19 wherein said stop collar comprises a washer disposed over said shaft and further comprising, at said second end portion of said shaft, a means to limit the movement of said washer.

22. The combination as in claim 19 wherein said firestop element comprises a flat washer.

23. The combination as in claim 19 wherein said firestop element comprises a washer that is self-centering in said passageway in said ceiling panel against which said firestop element is located.

24. The combination as in claim 23 wherein said self-centering washer comprises a flat peripheral portion and a generally conically-shaped center portion extending towards said second end of said shaft which is received in said passageway in said ceiling panel to thereby center said washer in said passageway.

25. The combination as in claim 19, wherein said spring comprises a coil spring and said shaft extends through a center portion of said coil spring.

26. The combination as in claim 19, wherein said spring comprises at least one flat spring element having apertures at each end thereof and said shaft extends through said spring apertures.

27. The combination as in claim 19, wherein said bolt has at its second end portion a self-drilling tip portion.

* * * * *